United States Patent
Landvogt (10) Patent No.: US 11,441,894 B2
(45) Date of Patent: Sep. 13, 2022

(54) APPARATUS AND METHOD FOR INSPECTING AND/OR MEASURING GEAR WHEELS

(71) Applicant: Klingelnberg GmbH, Hückeswagen (DE)

(72) Inventor: Alexander Landvogt, Rheinstetten-Mörsch (DE)

(73) Assignee: KLINGELNBERG GMBH, Huckeswagen (DE)

( * ) Notice: Subject to any disclaimer, the term of this patent is extended or adjusted under 35 U.S.C. 154(b) by 219 days.

(21) Appl. No.: 16/743,103

(22) Filed: Jan. 15, 2020

(65) Prior Publication Data

US 2020/0225027 A1    Jul. 16, 2020

(30) Foreign Application Priority Data

Jan. 16, 2019 (DE) .......................... 102019101027.6

(51) Int. Cl.
| | |
|---|---|
| *G01B 11/24* | (2006.01) |
| *G01H 9/00* | (2006.01) |
| *G01B 11/00* | (2006.01) |
| *B23F 9/10* | (2006.01) |

(52) U.S. Cl.
CPC ............ *G01B 11/2416* (2013.01); *B23F 9/10* (2013.01); *G01B 11/002* (2013.01); *G01H 9/00* (2013.01)

(58) Field of Classification Search
CPC .... G01B 11/2416; G01B 11/002; G01B 5/66; G01H 9/00; G01H 1/003; G01M 13/045; G01M 13/04; B23F 9/10
See application file for complete search history.

(56) References Cited

U.S. PATENT DOCUMENTS

| | | | | |
|---|---|---|---|---|
| 4,661,673 A | * | 4/1987 | Geiermann | .......... B23K 11/093 |
| | | | | 219/67 |
| 5,539,172 A | * | 7/1996 | Takase | .................. B23F 17/006 |
| | | | | 73/162 |
| 6,007,762 A | * | 12/1999 | Amateau | .................. C21D 8/00 |
| | | | | 266/126 |

(Continued)

FOREIGN PATENT DOCUMENTS

| | | |
|---|---|---|
| DE | 69418629 T2 | 3/2000 |
| DE | 19928500 A1 | 12/2000 |

(Continued)

*Primary Examiner* — Sang H Nguyen
(74) *Attorney, Agent, or Firm* — McCarter & English, LLP (57) ABSTRACT

An apparatus for inspecting and/or measuring a gear wheel workpiece, which comprises:
- a first workpiece spindle for fastening and rotationally driving the gear wheel workpiece,
- a rotational drive for rotationally driving the gear wheel workpiece when it is fastened on the first workpiece spindle,
- measuring means for inspecting and/or measuring the gear wheel workpiece when it is fastened on the first workpiece spindle, wherein the rotational drive is designed to
- rotationally drive the gear wheel workpiece including the first workpiece spindle during a measurement and/or inspection phase, while the measuring means is used for inspecting and/or measuring the gear wheel workpiece,
- rotationally drive the gear wheel workpiece including the workpiece spindle during a spinning phase to spin off a liquid.

18 Claims, 6 Drawing Sheets

(56) References Cited

U.S. PATENT DOCUMENTS

| | | | | |
|---|---|---|---|---|
| 6,577,917 | B1* | 6/2003 | Ronneberger | B23F 23/1218 |
| | | | | 700/164 |
| 2007/0277610 | A1* | 12/2007 | Landvogt | G01M 13/028 |
| | | | | 73/587 |
| 2011/0081833 | A1* | 4/2011 | Amarell | B23F 23/04 |
| | | | | 451/28 |
| 2014/0199924 | A1* | 7/2014 | Jaeger | B23F 19/057 |
| | | | | 451/253 |
| 2016/0025647 | A1* | 1/2016 | Frazee | B24B 19/009 |
| | | | | 356/237.2 |
| 2018/0369979 | A1* | 12/2018 | Passerini | B23B 13/04 |

FOREIGN PATENT DOCUMENTS

| | | |
|---|---|---|
| DE | 10012158 A1 | 9/2001 |
| DE | 102009048012 A1 | 4/2011 |
| DE | 102011082869 A1 | 3/2013 |
| DE | 102011119000 A1 | 5/2013 |
| DE | 102015107485 B3 | 9/2016 |
| EP | 1862789 A1 | 12/2007 |

\* cited by examiner

APPARATUS AND METHOD FOR INSPECTING AND/OR MEASURING GEAR WHEELS

CROSS-REFERENCE TO RELATED APPLICATIONS

This application claims priority under 35 U.S.C. §§ 119(a)-(d) to German patent application no. DE 10 2019 101 027.6 filed Jan. 16, 2019, which is hereby expressly incorporated by reference as part of the present disclosure.

FIELD OF THE INVENTION

The present disclosure relates to an apparatus and a method for inspecting and/or measuring gear wheels.

BACKGROUND

There are various approaches for the automated machining of gear wheel workpieces. Facilities are in the foreground hereafter in which multiple sequences or procedures on and around a gear wheel workpiece are combined in an assembly phase or in the form of an assembly. Such facilities are referred to here as machining centers, wherein this term is to be understood broadly.

Such a machining center comprises at least one region which is used for machining the gear wheel workpiece. The machining of the gear wheel workpiece can involve, for example, the preliminary gear cutting and/or the gear cutting and/or the finish machining of gear wheel workpieces.

Figure 1:
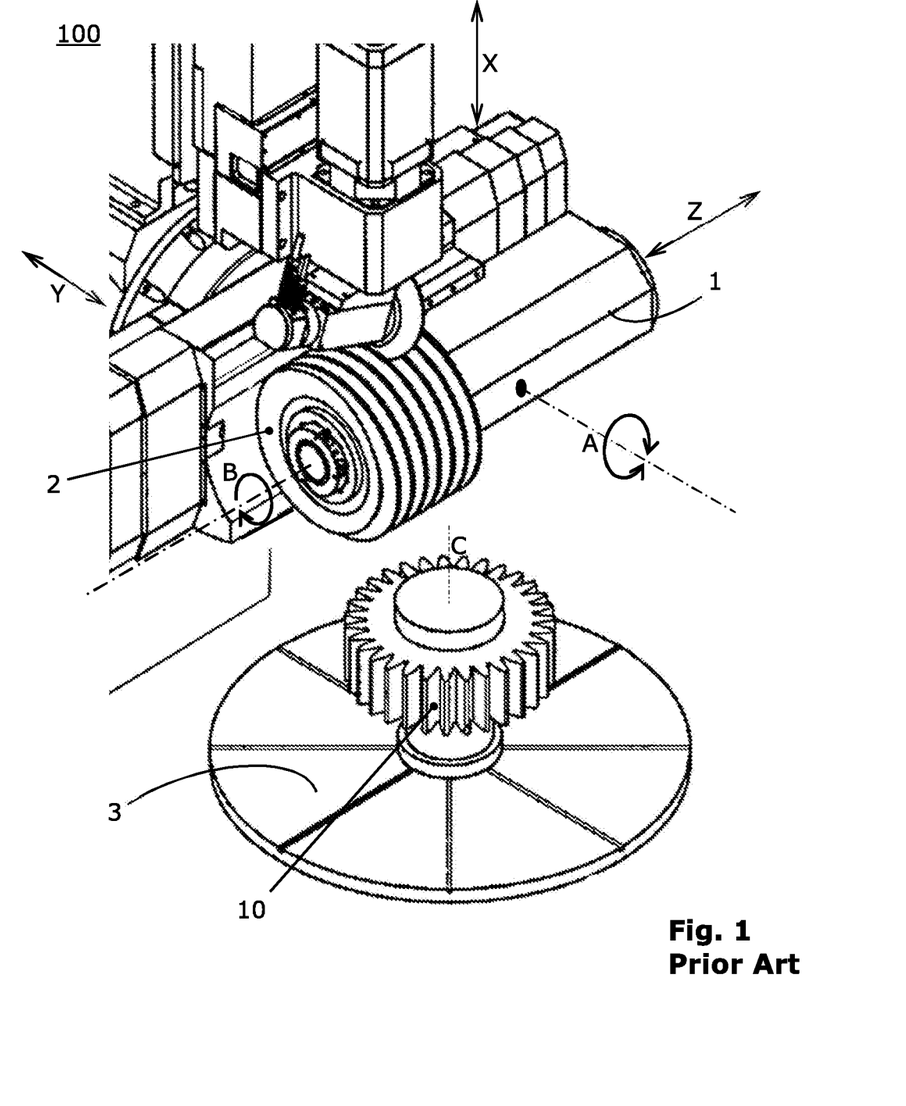
FIG. 1 shows a schematic perspective view of a machining center according to the prior art, which is designed in one region for (generating) grinding of a gear wheel workpiece.

Elements of the machining region of an exemplary machining center 100 are shown in FIG. 1, which comprises the elements of a grinding machine. Only the essential elements are identified in this illustration, specifically these are the tool spindle 1 including a grinding tool 2 and a workpiece spindle 3 having a gear wheel workpiece 10. Moreover, some of the axes which can be used during the generating grinding of the workpiece 10 are shown in this illustration. These are three NC-controllable linear axes X, Y, and Z here. Moreover, there is an axis of rotation B (called tool rotation axis), to be able to rotationally drive the grinding tool 2. The tool spindle 1 including the grinding tool 2 can be pivoted around a pivot axis A to bring the pitch of the worm grinding wheel 2 into accordance with the angle of inclination of the workpiece 10. Furthermore, there is one rotation axis C (also called workpiece axis) to be able to rotationally drive the workpiece 10. It can be seen on the basis of FIG. 1 that an entire array of coordinated, NC-controlled linear, rotational, and pivot movements are required to be able to perform generating grinding on a workpiece 10 using a grinding tool 2.

A machining center can comprise further machining regions and/or one or multiple measurement or inspection regions in addition to a machining region, as shown in FIG. 1, for example. A measurement or inspection region comprises a measurement or inspection apparatus.

A machining center or a measurement or inspection apparatus can comprise a handling device for loading and unloading gear wheel workpieces if the individual sequences are to run automatically.

In such machining centers and measurement or inspection apparatus, the throughput per unit of time has great significance, since the cost-effectiveness is dependent on the throughput. The throughput results as the total of the individual machining times, inspecting or measuring times, and the total secondary processing times.

Therefore, parallelization of individual procedures has been focused on for some time in order to increase the throughput per unit of time. While, for example, a first gear wheel workpiece is cut in the machining region of the machining center, for example, a second gear wheel workpiece can be subjected to a quality control in a measurement or inspection region of the machining center. The measuring or inspecting of a gear wheel workpiece can be performed before, during, or after the machining.

The demand exists for further optimizing machining gear wheel workpieces in a machining center and measuring or inspecting gear wheel workpieces in a measurement or inspection apparatus, wherein particular attention is oriented on the productivity.

SUMMARY

The object of the present disclosure is to provide a method which is efficient and suitable for use in mass production of gear wheel workpieces. The objective is to provide a corresponding measurement or inspection apparatus.

The measurement or inspection of a gear wheel workpiece can take place either before, during, or after the machining.

For the purpose of the present specification and claims, a measurement or inspection is a process where geometric data, positions or other characteristics of the gear wheel workpiece are being measured or determined by measuring means and forwarded or handed over to a post-processing unit (e.g. a computer).

The apparatus in at least some embodiments defines a machining center having two or more than two workpiece spindles (referred to as multispindle embodiment), or the apparatus can be part of a machining center in at least some embodiments, respectively.

The apparatus and the method are distinguished by optimized movement paths, which are short and/or which enable a rapid transfer of a gear wheel workpiece from a workpiece spindle, or from one of multiple workpiece spindles to another workpiece spindle of the apparatus.

The apparatus can comprise automated chucking systems on one or on multiple workpiece spindles in at least some embodiments.

The machining center in at least some embodiments comprises automatically actuatable chucking means (for example, in the form of chucking jaws) on all workpiece spindles, for example, to be able to loosen a gear wheel workpiece and remove it by way of the handling device and, for example, to be able to supply a gear wheel workpiece by means of the handling device and chuck it on a workpiece spindle.

The machining center may comprise a handling device in at least some embodiments, which is designed for the direct loading and unloading of the gear wheel workpieces on one or on multiple workpiece spindles of the machining center.

The machining center may comprise a handling device in at least some embodiments, which has a direct access to at least one conveyor belt—for example a circulating conveyor belt—to pick up gear wheel workpieces therefrom and deposit them there again later.

All sequences, including the movements of the handling device, may be controlled and executed by a common machine controller, wherein the machining center executes the individual machining, inspecting, or measuring procedures cyclically.

In at least a part of the embodiments, the machining center can be designed so that both the machining region of the machining center, and also the inspection device of the machining center and/or the handling device of the machining center each have a separate controller, wherein these controllers are orchestrated via a communication interface to control the interaction of machining region, inspection device, and handling device.

The apparatus and the method can be designed in at least some embodiments so that the handling of a gear wheel workpiece comprises multiple phases. The sequence of the individual phases can be arbitrary. Some of the phases are mentioned by way of example hereafter. Some of the embodiments can comprise all of the phases mentioned hereafter, other embodiments in turn comprise only a subset of the mentioned phases:

supply phase for introducing and chucking a workpiece in the apparatus;

machining phase for the preliminary gear cutting and/or gear cutting and/or finish machining of a gear wheel workpiece using a tool of the apparatus;

measurement or inspection phase for measuring and/or inspecting a gear wheel workpiece in the apparatus;

spinning phase for spinning off a liquid which was previously applied (for example, during the machining and/or measurement/inspection) to the gear wheel workpiece;

removal phase for un-chucking and removing a workpiece from the apparatus.

The method can be especially designed in at least some embodiments for measuring and/or inspecting a gear wheel workpiece, wherein the gear wheel workpiece is spun during a spinning phase before and/or during the measurement and/or inspection to spin off a liquid from the gear wheel workpiece.

A liquid, as employed herein, is an oil-based liquid which does not contain any contaminations, such as metal parts or chips. The respective liquid does not carry any abrasive material either. That is, the liquid which is used in at least some embodiments is a "clean" or "pure" liquid which is chosen so as to serve as lubricant and/or coolant and/or contrast agent.

This can be a liquid which at least partially wets the gear wheel workpiece or which adheres to the gear wheel workpiece. The liquid (for example, a gear oil) is applied to the gear wheel workpiece before or during the measurement or inspection phase.

In at least some embodiments, the liquid is a lubricant and/or coolant and/or contrast agent.

The measurement and/or inspection takes place in the same chucking as the spinning off, i.e., the gear wheel workpiece does not have to be removed and chucked on another workpiece spindle before the spinning phase.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations, and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Exemplary embodiments, which are understood not to be limiting, are described in greater detail hereafter with reference to the drawings.

DETAILED DESCRIPTION

Terms are used in conjunction with the present description which are also used in relevant publications and patents. However, it is to be noted that the use of these terms is merely to serve for better comprehension. The inventive concepts and the scope of protection of the claims for protection are not to be restricted in the interpretation by the specific selection of the terms. The invention may be readily transferred to other term systems and/or technical fields. The terms are to be applied accordingly in other technical fields.

Figure 2A:
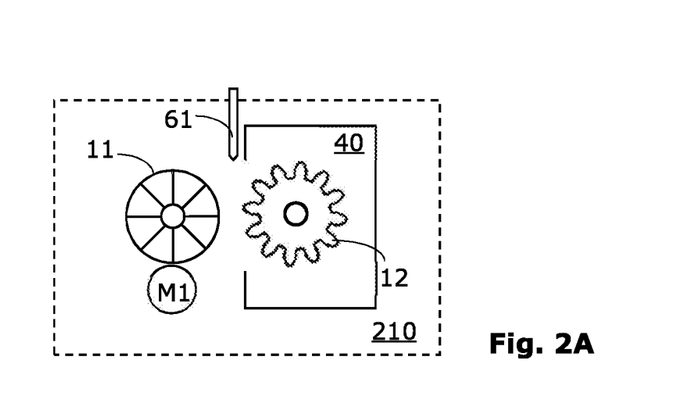
FIG. 2A shows a schematic top view of a measurement or inspection device, wherein the corresponding device can be used for single-flank rolling inspection and/or for double-flank rolling inspection and/or for helix inspection and/or for structure-borne noise inspection and/or for rotational acceleration inspection and wherein only one master gear wheel is installed.

FIG. 2A shows a schematic top view of a first apparatus 210, which is designed for inspecting and/or measuring a gear wheel workpiece 10. Only the essential components and elements are each shown in schematic form here.

The apparatus 210 comprises a first workpiece spindle 11 for fastening and rotationally driving the gear wheel workpiece 10. This spindle 11 comprises a vertical axis of rotation, which is arranged, for example, on a machine bed. A rotational drive M1 is provided for the rotational driving of the gear wheel workpiece 10 to be able to rotate it at an angular velocity $\omega 1$ around the vertical axis of rotation when the gear wheel workpiece 10 is fastened on the first spindle.

The rotational drive M1 is designed so that it is able to provide for a controlled (for example an NC-controlled) rotation of the gear wheel workpiece 10 during an inspection and/or measuring phase.

The apparatus 210 furthermore comprises measuring means 40 for inspecting and/or measuring the gear wheel workpiece 10 when it is fastened on the first spindle 11.

Greatly varying measurement means can be used here in at least some embodiments, for example, means for single-flank or double-flank rolling inspection and/or for helix inspection and/or for structure-borne noise inspection and/or for rotational acceleration inspection or optical or other contactlessly operating measuring means (for example, a laser scanner).

The apparatus 220 can comprise a liquid supply 60 in at least some embodiments to apply a liquid F1 to the gear wheel workpiece 10 before it is fastened on the first spindle 11.

The apparatus 210 can comprise a liquid supply 61 in at least some embodiments to apply a liquid F2 to the gear wheel workpiece 10 when the gear wheel workpiece 10 is fastened on the first spindle 11. The liquid F2 (for example, a gear oil) can be used before the measurement or inspection phase or during the measurement or inspection phase.

Embodiments are also possible in which the apparatus 220 comprises a liquid supply 60 and the apparatus 210 comprises a liquid supply 61, wherein these can apply different liquids F1 and F2. It is, however, also possible for F1 and F2 to be the same liquid.

The handling of a gear wheel workpiece 10 in a apparatus 210 comprises multiple phases in at least some embodiments. The sequence of the individual phases can be arbitrary. Several of the phases are mentioned by way of example hereafter. Some of the embodiments can comprise all of the phases mentioned hereafter, other embodiments in turn comprise only a subset of the mentioned phases:

Supply phase: this phase is used for introducing and chucking a workpiece 10 in the apparatus 210. The introduction can be performed in a manual, partially automated, or fully automated manner.

Machining phase: this phase is used for the preliminary gear cutting and/or the gear cutting and/or the finish machining of a gear wheel workpiece 10 using a tool 22 of the apparatus 220.

Measurement or inspection phase: this phase is used for the measurement and/or inspection of a gear wheel workpiece 10 in the apparatus 210. In the measurement or inspection phase, the gear wheel workpiece 10 can be subjected using the means 40, for example, to a single-flank rolling inspection, a double-flank rolling inspection, helix inspection, a structure-borne noise inspection in single-flank or double-flank contact, a rotational acceleration inspection in single-flank contact, or an optical or other contactlessly operating measurement or inspection (for example, using a laser scanner).

Spinning phase: this phase is used for spinning off a liquid F1 and/or F2 which was previously applied to the gear wheel workpiece 10.

Removal phase: this phase is used for the unchucking and removal of a workpiece 10 from the apparatus 210. The removal can be performed in a manual, partially automated, or fully automated manner.

The rotational drive M1 can be designed in at least some embodiments for the purpose of rotationally driving the gear wheel workpiece 10 including the first spindle 11 during a measurement or inspection phase around the vertical axis of rotation, while the measuring means 40 are used for inspecting and/or measuring the gear wheel workpiece 10. In at least some embodiments, the rotational drive M1 thus comprises an angular encoder so as to be able to control the rotation of the rotational drive M1.

Figure 2B:
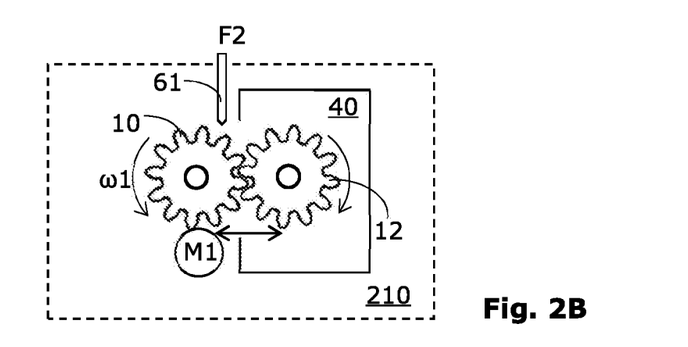
FIG. 2B shows a schematic top view of the measurement or inspection device of FIG. 2A, wherein a gear wheel workpiece and the master gear wheel roll on one another.

This measurement or inspection phase is illustrated in FIG. 2B. A master gear wheel 12 is used here, for example, which rolls on the gear wheel workpiece 10 during a single-flank or double-flank rolling inspection and/or for helix inspection and/or for structure-borne noise inspection and/or for rotational acceleration inspection. For this purpose, the gear wheel workpiece 10 can be rotationally driven, for example, at a first angular velocity $\omega 1$.

Figure 2C:
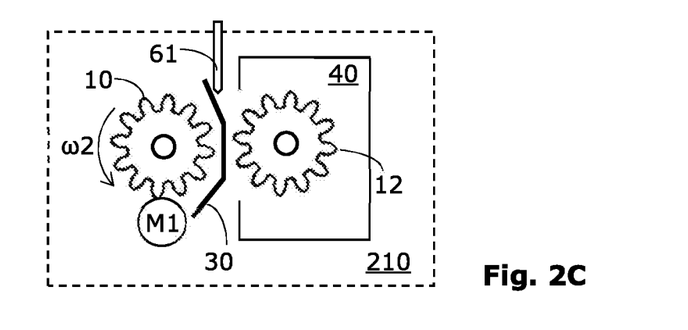
FIG. 2C shows a schematic top view of the measurement or inspection device of FIG. 2A, wherein the gear wheel is spun.

The rotational drive M1 can also be designed in at least some embodiments to rotationally drive the gear wheel workpiece 10 including the first spindle 11 during a spinning phase to spin off a liquid F1 and/or F2 which was previously applied. This second phase is illustrated in FIG. 2C.

The spinning phase can also be applied in at least some embodiments, for example, before and/or after the measurement or inspection phase.

In at least some embodiments, the liquid F1 and/or F2 can be a coolant, a lubricant (for example, a gear oil), a coolant lubricant, a contrast agent, or the like.

The liquid F1 and/or F2 can be supplied in at least some embodiments, for example, by means of a liquid supply 60 and/or 61, which is symbolized in the figures by a single nozzle.

The rotational drive M1 in at least some embodiments rotationally drives the gear wheel workpiece 10 including the first spindle 11 during the measurement or inspection phase or during the machining phase at a first rotational velocity $\omega 1$ and during the spinning phase at a second rotational velocity $\omega 2$, wherein the second rotational velocity $\omega 2$ is greater than the first rotational velocity $\omega 1$.

The rotational drive M1 comprises a boost mode in at least some embodiments to highly accelerate the gear wheel workpiece 10 including the first spindle 11 rapidly for a brief moment in order to reliably and rapidly spin off the liquid F1 and/or F2 during the spinning phase.

Figure 3A:
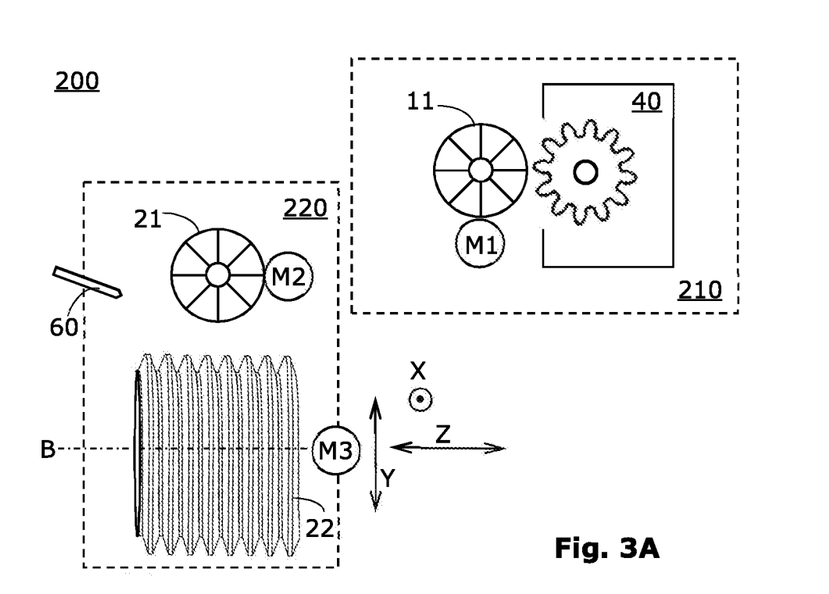
FIG. 3A shows a schematic top view of a machining center having a measurement or inspection device, wherein the machining center can be used for generating grinding and/or for single-flank rolling inspection and/or for double-flank rolling inspection and/or for helix inspection and/or for structure-borne noise inspection and/or for rotational acceleration inspection and wherein only a master gear wheel and a worm grinding wheel are installed.

In at least some embodiments, the apparatus 210 comprises a hood 31 and/or a protective shield 30, which is/are movably mounted so that it/they can be moved into a protective position before the spinning phase. A protective shield 30, which at least partially encloses the gear wheel workpiece 10, is indicated in FIG. 2C. A hood 31 which completely laterally encloses the gear wheel workpiece 10 is indicated in FIG. 3D.

The hood 31 and/or the protective shield 30 are arranged in at least some embodiments in a machine bed or in a region below the first spindle 11 so that they can be moved upward if needed.

The apparatus 210 may comprise a drain for the spun-off liquid F1 and/or F2 in the region of the first spindle 11 in at least some embodiments.

A further embodiment is described on the basis of FIGS. 3A to 3D. The apparatus 210 of this further embodiment is a component of a machining center 200. The machining center 200 comprises a machining region 220 having at least one second workpiece spindle 21 for fastening and rotationally driving the gear wheel workpiece 10.

This spindle 21 comprises a vertical axis of rotation, which is arranged, for example, on a machine bed. A rotational drive M2 is provided for rotationally driving the gear wheel workpiece 10 to be able to rotate it at an angular velocity $\omega 2$ when the gear wheel workpiece 10 is fastened on the spindle 21.

Embodiments are shown and described here which comprise a machine bed which is aligned essentially horizontally. The spindles 11 and 21 comprise axes of rotation which stand vertically in space. However, other axial constellations (for example, having horizontal or inclined spindle axes) are also possible. The embodiments shown and described are therefore not to be understood as restrictive with respect to the axial constellation.

A rotationally-drivable gear cutting tool 22 (a worm grinding wheel shown here by way of example) is arranged in the machining region 220. The gear cutting tool 22 can be rotationally driven by means of a rotational drive M3 around an axis B.

The machining center 200 can furthermore comprise multiple axes (for example, linear axes X, Y, Z) in at least some embodiments, which are designed, for example, for executing machining movements of the gear cutting tool 22 in relation to the gear wheel workpiece 10 during the machining phase, while the gear wheel workpiece 10 is fastened on the second spindle 21.

The machining center 200 can furthermore comprise multiple axes (for example, linear axes X, Y, Z) in at least some embodiments, which are alternatively or additionally also designed for executing other movements.

The measurement or inspection apparatus 210, in at least some embodiments which comprise a separate machining region 220, can be arranged adjacent to this machining region 220, as indicated in FIGS. 3A to 3D.

FIG. 3A shows the machining center 200 before the equipping with a gear wheel workpiece 10. I.e., a snapshot is shown before the supply phase.

Figure 3B:
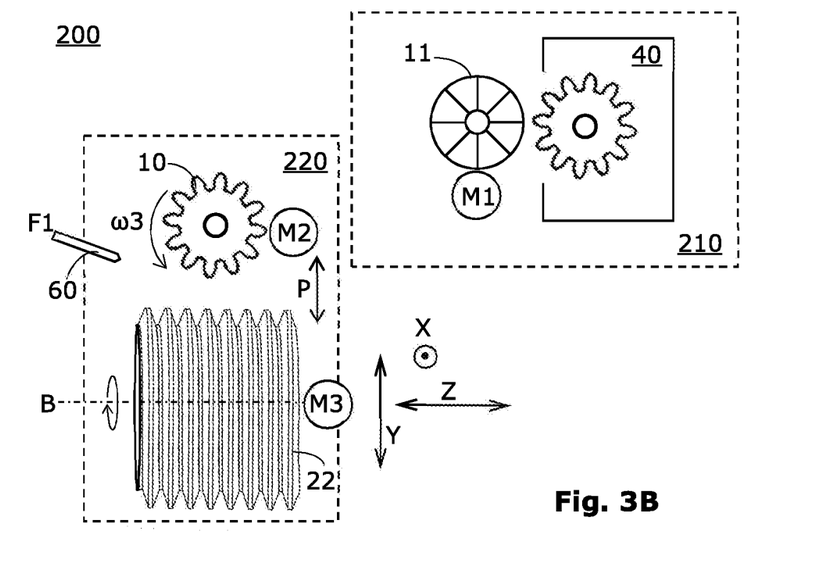
FIG. 3B shows a schematic top view of the machining center of FIG. 3A, wherein a gear wheel workpiece is engaged with a worm grinding wheel for the purpose of generating grinding.

FIG. 3B shows the machining center 200 after the equipping of the second spindle 21 with a gear wheel workpiece 10, i.e., the snapshot is shown after the supply phase and before the beginning of the machining phase. The double arrow P is to indicate a relative machining movement and/or infeed movement.

Figure 3C:
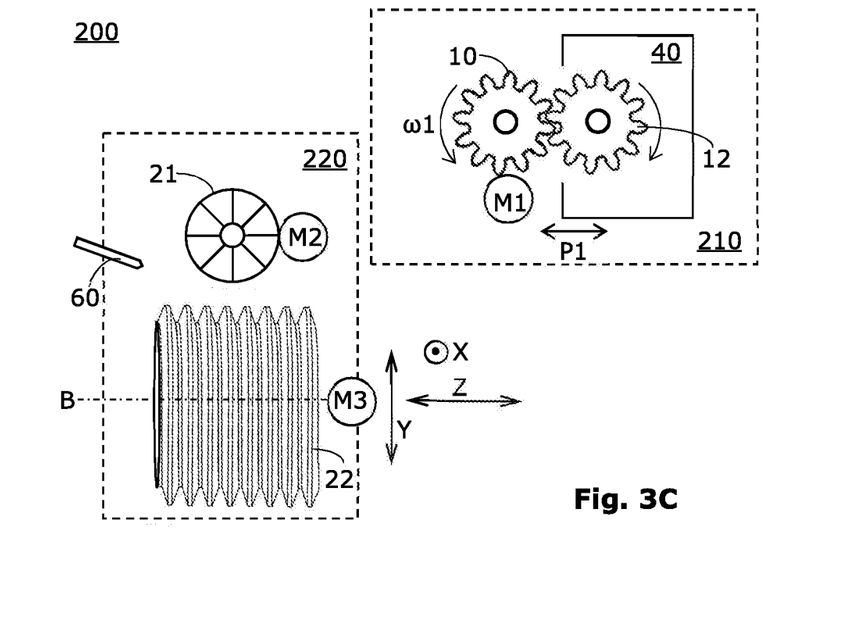
FIG. 3C shows a schematic top view of the machining center of FIG. 3A, wherein the gear wheel workpiece has been transferred after the rolling grinding onto a spindle of the measurement or inspection device to roll on the master gear wheel therein.
Figure 3D:
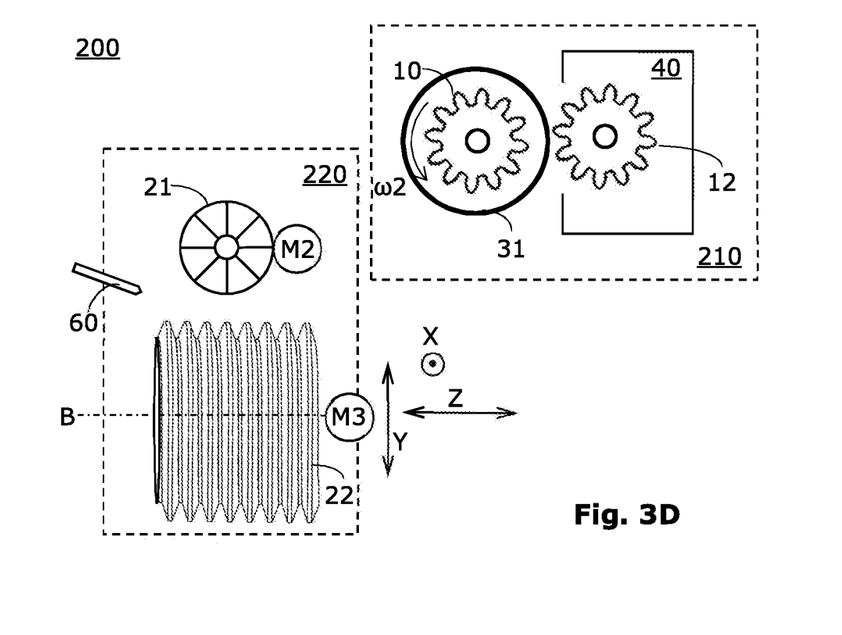
FIG. 3D shows a schematic top view of the machining center of FIG. 3A, wherein the gear wheel workpiece is spun.

FIG. 3C shows the machining center 200 after a transfer of the gear wheel workpiece 10 from the second spindle 21 to the first spindle 11 and during the performance of a measurement and/or inspection, i.e., a snapshot is shown during the measurement or inspection phase.

The double arrow P1 indicates that the gear wheel workpiece 10 is engaged during the measurement and/or inspection with a master gear wheel 21. ω1 is the angular velocity during the measurement and/or inspection.

FIG. 3D shows the machining center 200 after the measurement or inspection. The gear wheel workpiece 10 was separated from the master gear wheel 21 and a hood 31 has been brought into position to collect the liquid F1 and/or F2 which would otherwise soil other regions during the spinning off. FIG. 3D thus shows the spinning phase.

Figure 4:
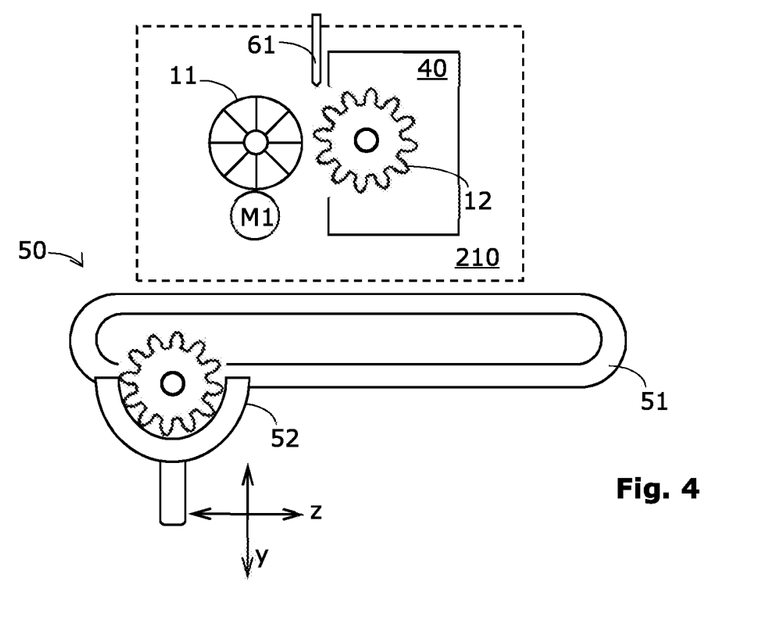
FIG. 4 shows a schematic top view of a second embodiment of a measurement or inspection device, wherein the measurement or inspection device is equipped with a handling device.

The apparatus 210 can in at least some embodiments comprise a handling device 50, as schematically shown in FIG. 4, which is designed to transfer the gear wheel workpiece 10 from a workpiece supply 51 (for example, from a circulating conveyor belt) to the first spindle 11. A gripper 52, for example, can be used for this purpose, which can be moved at least in the y-z plane. The handling device 50 of FIG. 4 can be used, for example, in the scope of the supply phase.

Figure 5:
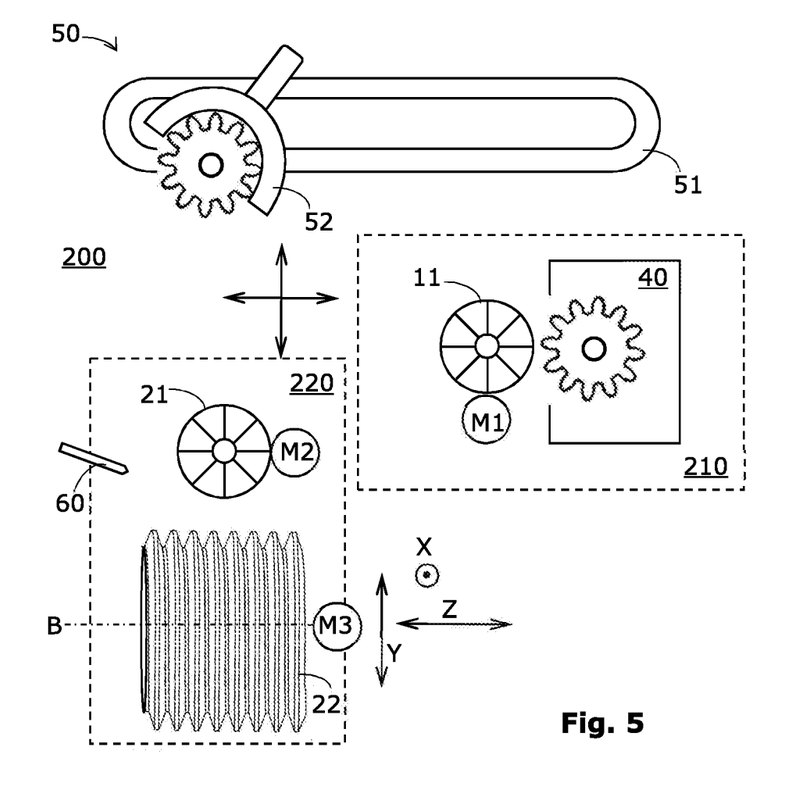
FIG. 5 shows a schematic top view of a second embodiment of a machining center having a measurement or inspection device, which is equipped with a handling device.

The apparatus 210 can in at least some embodiments comprise a handling device 50, as schematically shown in FIG. 5, which is designed to transfer the gear wheel workpiece 10 from a workpiece supply 51 (for example, from a circulating conveyor belt) to the second spindle 21 and/or to transfer the gear wheel workpiece 10 from the second spindle 21 to the first spindle 11. A gripper 52, for example, can be used for this purpose in at least some embodiments, which can be moved at least in the y-z plane.

The gripper 52 can be moved in at least some embodiments by a gantry arrangement, or it can be part of a robot system in at least some embodiments.

The apparatus 210 can comprise a handling device in at least some embodiments, which is used not only as a workpiece supply, but rather also comprises, for example, multiple supply and removal belts, for example, to be able to remove gear wheel workpieces 10 sorted according to quality classes by way of various removal belts after a measurement and/or inspection.

The spinning phase may be used at latest before the removal phase, to prevent the liquid from soiling downstream facilities or devices upon the removal of a workpiece 10 from the apparatus 210. The apparatus 210 can in at least some embodiments comprise a drive M1, which is associated with the workpiece spindle 11 and is designed to rotationally drive the gear wheel workpiece 10 at a speed greater than 300 RPM, for example greater than 1000 RPM, to spin off the liquid F1 and/or F2 as completely as possible during the spinning phase.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. An apparatus comprising:
a first spindle adapted to fasten thereon and rotationally drive a gear wheel workpiece;
a rotational drive adapted to rotationally drive the gear wheel workpiece when it is fastened on the first spindle;
a measurement device configured to obtain geometric data of, a position of, a structural characteristic of and/or a noise characteristic of the gear wheel workpiece when it is fastened on the first spindle;
wherein the rotational drive is adapted to
rotationally drive the first spindle with the gear wheel workpiece fastened thereon during a measurement/inspection phase at a first rotational velocity, while the measurement device obtains geometric data of, a position of, a structural characteristic of and/or a noise characteristic of the gear wheel workpiece, and
rotationally drive the first spindle with the gear wheel workpiece fastened thereon at a second rotational velocity that is greater than the first rotational velocity during a spinning phase adapted to spin off liquid that at least partially wets and/or adheres to the gear wheel workpiece.

2. The apparatus according to claim 1, further comprising a hood and/or a protective shield movable into a position that (i) at least partially encloses the gear wheel workpiece before the spinning phase; and/or (ii) collects liquid spun off during the spinning phase.

3. The apparatus according to claim 1, wherein the measurement device is configured to, during the measurement/inspection phase,
perform a single-flank rolling inspection, perform a double-flank rolling inspection,
perform a helix inspection,
perform a structure-borne noise inspection,
perform a rotational acceleration inspection, and/or
obtain said geometric data of, a position of, a structural characteristic of and/or a noise characteristic of the gear wheel workpiece without the measurement device contacting the workpiece.

4. The apparatus as claimed in claim 3, wherein the measurement device includes a master gear wheel engageable with the gear wheel workpiece and configured to perform the single-flank rolling inspection, the double-flank rolling inspection, the helix inspection, the structure-borne noise inspection and/or the rotational acceleration inspection.

5. The apparatus according to claim 3, wherein the liquid includes a lubricant, coolant and/or contrast agent.

6. The apparatus according to claim 1, wherein the measurement device is configured to obtain said geometric data of, a position of, a structural characteristic of and/or a noise characteristic of the gear wheel workpiece during the measurement/inspection phase while the gear wheel workpiece is rotationally driven.

7. The apparatus according to claim 6, wherein the measurement device is configured to optically obtain said geometric data of, a position of, a structural characteristic of and/or a noise characteristic of the gear wheel workpiece.

8. The apparatus according to claim 7, wherein the liquid includes a contrast agent.

9. The apparatus according to claim 1, further comprising a liquid supply configured to apply the liquid to the gear wheel workpiece (i) before it is fastened on the first spindle, and/or (ii) when the gear wheel workpiece is fastened on the first spindle and the measurement device is obtaining said geometric data of, a position of, a structural characteristic of and/or a noise characteristic of the workpiece.

10. The apparatus according to claim 1, further comprising a handler configured to transfer the gear wheel workpiece from a workpiece supply to the first spindle.

11. The apparatus according to claim 10, wherein the handler comprises (i) a gripper configured to grip to the gear wheel workpiece and (ii) the workpiece supply, wherein the workpiece supply includes a circulating belt.

12. The apparatus according to claim 1, wherein the apparatus defines a component of a machining center, in combination with a machining portion including:
at least one second spindle adapted to fasten thereon and rotationally drive the gear wheel workpiece,
a rotationally-drivable gear cutting tool,
multiple axes configured to execute machining movements of the gear cutting tool relative to the gear wheel workpiece when the gear wheel workpiece is fastened on the second spindle, and
a liquid supply adapted to apply liquid to the gear wheel workpiece.

13. The apparatus according to claim 12, wherein the liquid supply is configured to apply liquid to the gear wheel workpiece when the gear wheel workpiece is located in the machining portion.

14. The apparatus according to claim 12, further comprising a handler configured to transfer the gear wheel workpiece from a workpiece supply to the second spindle and from the second spindle to the first spindle.

15. The apparatus according to claim 1, wherein the first spindle is configured to rotationally drive the gear wheel workpiece during the spinning phase at a speed greater than about 300 RPM to spin off the liquid from the gear wheel workpiece.

16. A method comprising:
chucking a gear wheel workpiece in an apparatus, the apparatus comprising
a first spindle including a chuck adapted to fasten thereon and rotationally drive a gear wheel workpiece;
a rotational drive adapted to rotationally drive the gear wheel workpiece when it is fastened on the first spindle;
a measurement device configured to obtain geometric data of, a position of, a structural characteristic of and/or a noise characteristic of the gear wheel workpiece when it is fastened on the first spindle;
wherein the rotational drive is adapted to
rotationally drive the first spindle with the gear wheel workpiece fastened thereon during a measurement/inspection phase at a first rotational velocity, while the measurement device obtains geometric data of, a position of, a structural characteristic of and/or a noise characteristic of the gear wheel workpiece, and
rotationally drive the first spindle with the gear wheel workpiece fastened thereon at a second rotational velocity that is greater than the first rotational velocity during a spinning phase adapted to spin off liquid that at least partially wets and/or adheres to the gear wheel workpiece;
wherein the chucking step includes chucking the gear wheel workpiece in the chuck;
obtaining geometric data of, a position of, a structural characteristic of and/or a noise characteristic of the gear wheel workpiece; and
performing a spinning phase including spinning the gear wheel workpiece before and/or after the obtaining step, thereby spinning liquid off of the gear wheel workpiece;
wherein the method includes performing the obtaining step and the spinning step without re-chucking the gear wheel workpiece.

17. The method according to claim 16, wherein
the obtaining step includes rotationally driving the gear wheel workpiece when it is fastened on the first spindle at said first rotational velocity; and
the spinning step includes rotationally driving the gear wheel workpiece when it is fastened on the first spindle at said second rotational velocity.

18. The method according to claim 17, wherein the second rotational velocity is greater than 300 RPM to spin the liquid off of the gear wheel workpiece during the spinning phase.

* * * * *